March 12, 1963 M. FRIEDEL 3,080,802
VISIBLE PHOTO COMPOSER
Filed July 28, 1960 2 Sheets-Sheet 2

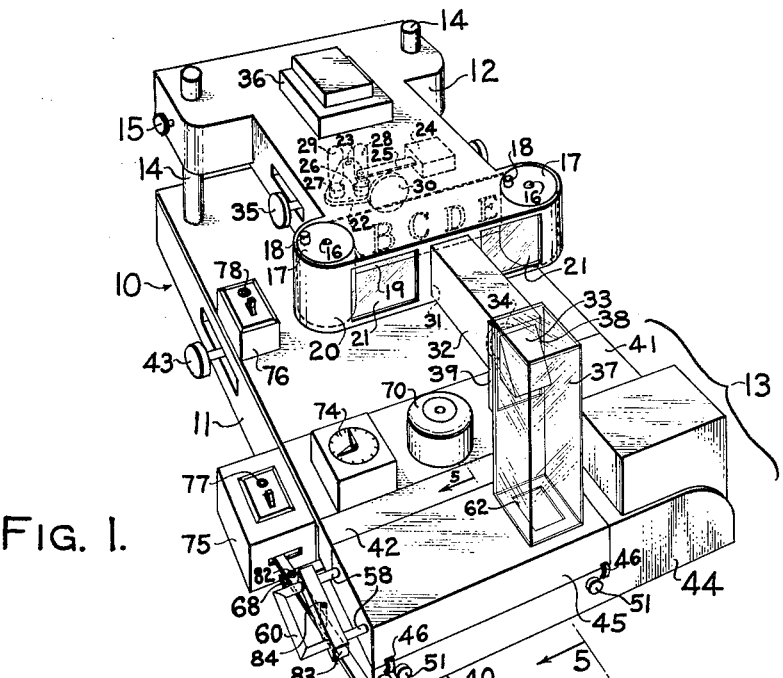

INVENTOR.
MURRAY FRIEDEL
BY
ATTORNEY

United States Patent Office 3,080,802
Patented Mar. 12, 1963

3,080,802
VISIBLE PHOTO COMPOSER
Murray Friedel, North Miami Beach, Fla., assignor to Visual Graphics Corp., New York, N.Y., a corporation of New York
Filed July 28, 1960, Ser. No. 45,874
6 Claims. (Cl. 95—4.5)

This invention relates to the art of photography, and has for its objective the creation of a machine by which light-resistant images on light transmitt'ng material, such as a negative film, may be successively exposed to, and reproduced on, light-sensitive paper, and simultaneously developed, the entire process being visible during the entire operation. With this machine the operator can see the image projected upon the paper before exposure, adjust its position thereon, and then expose and develop the paper in one operation, in daylight, the light-sensitized paper being always visible to the operator, but shielded from exposure light, except as desired.

Photo composition is the art or process of preparing captions, headings, lines of lettering and advertising material on photographic, or light-sensitized paper, from selected portions of negative film, the film being made by photographing previously hand-drawn images, such as alphabets and the like. By the use of this process, therefore, instead of hand-drawing each individual layout, a considerable amount of t'me is saved, as well as the considerable expense of each hand-drawn layout. For example, words and phrases can thus be photographed, letter by letter, to make the completed layout for advertising, etc.

One of the most profitable commercial fields for the application of this process is in the field of photo-lettering where, as has been previously stated, captions, headings and lines of lettering are prepared for advertising media. While the scope of the present invention encompasses a far greater field of activity, for the purposes of illustration and convenience the field of photo lettering is used for explanatory purposes.

In the present state of the art there are photo-lettering machines that perform the function of selectively reproducing letters from a master alphabet on to light-sensitized paper to form words, phrases and the like. However, in these machines the l'ght-sensitized paper is completely enclosed therein and invisible during the entire process, so that, as each letter is exposed to the paper the paper must be mechanically advanced to be spaced for the next letter. This is done by moving the paper along a roller or carriage by some advancing device calibrated to designate spacings or distances, to set the machine for the next letter to be photographed. Frequently a layout sheet is provided atop the carriage. This is a sheet on which the letters and words have been roughly spaced out as a spacing guide, and placed directly over the carriage portion in which the photographic paper lies, and moved coinc'dently with it. The layout sheet requires time to prepare, and delays the actual photographing process.

These methods, as is obvious, are unsatisfactory for many reasons. They are subject to malfunction of the spacing elements. Change of letter width, spacing, or even over-lapping, cannot be carried out with precision. Furthermore, occasions arise when the carriage or roller carrying the photographic paper slips or jumps (of which the operator may be unaware), in which event the letters following would be photographed out of position or in double exposure, spoiling the entire layout. This cannot be discovered, with present mach'nes, until the entire photography process is completed, the paper taken out and devloped. The entire layout would then have to be discarded, and the entire process repeated.

For these, and other obvious reasons, the present types of photo composing machines cannot produce uniformly perfect results, without possibilities of error and failure.

It is therefore the principal object of my invention to create a photo composing machine adapted to visibly disclose to the operator the position of the image with respect to the photographic paper before exposure thereon.

A second important object of my invention is to provide a photo composing machine adapted to develop each image immediately following exposure to the photographic paper.

A third important object of my invention is to provide a photo composing machine in which the entire layout of photographic paper, both exposed and unexposed, is visible to the operator at all times during the operation and as the operation progresses.

A fourth important object of my invention is to provide a photo compos'ng machine where the visibility of the entire layout of photographic paper during the process of the operation enables the operator to adjust the spacing of each image as desired or required.

A fifth important object of my invention is to provide a photo composing machine which can be operated in full dayl'ght without affecting the photographic paper.

A sixth important object of my invention is to provide a photo composing machine where visibility of the photographic paper enables the operator to enlarge, reduce, space, jump or over-lap any individual image with respect to the remaining images, exposed or to be exposed, on the layout.

Other salient objects, advantages and functional features of my invention, together with the novel features of construction, composition and arrangement of parts, will be more readily apparent from an examination of the following description, taken with the accompanying drawings, wherein:

FIG. 1 is a top perspective view of a preferred embodiment of my invention;

FIG. 2 is an enlarged, top perspective view of the exposure-developer unit of the machine;

Figure 5:
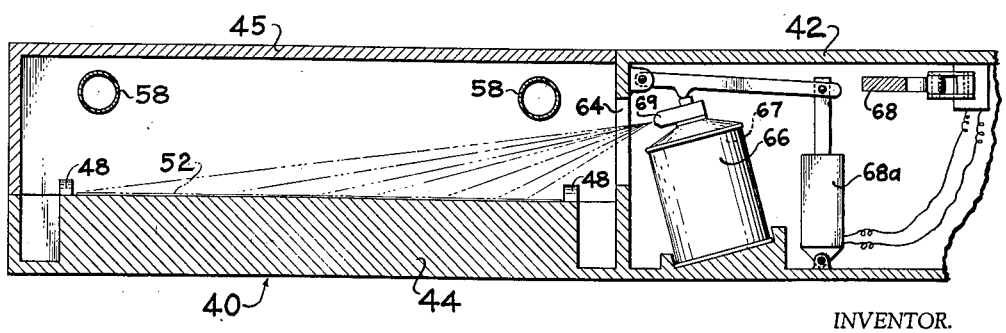

FIG. 3 and FIG. 4 diagrammatically show the operation cycles for exposure and development of the photographic paper;

FIG. 5 is a cross-sectoional enlarged view, taken on lines 5—5 of FIG. 1; and

Figure 6:
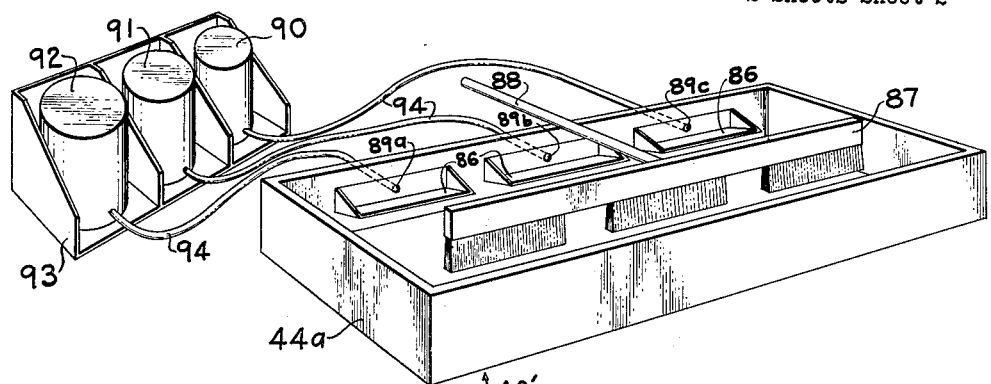
Figure 7:
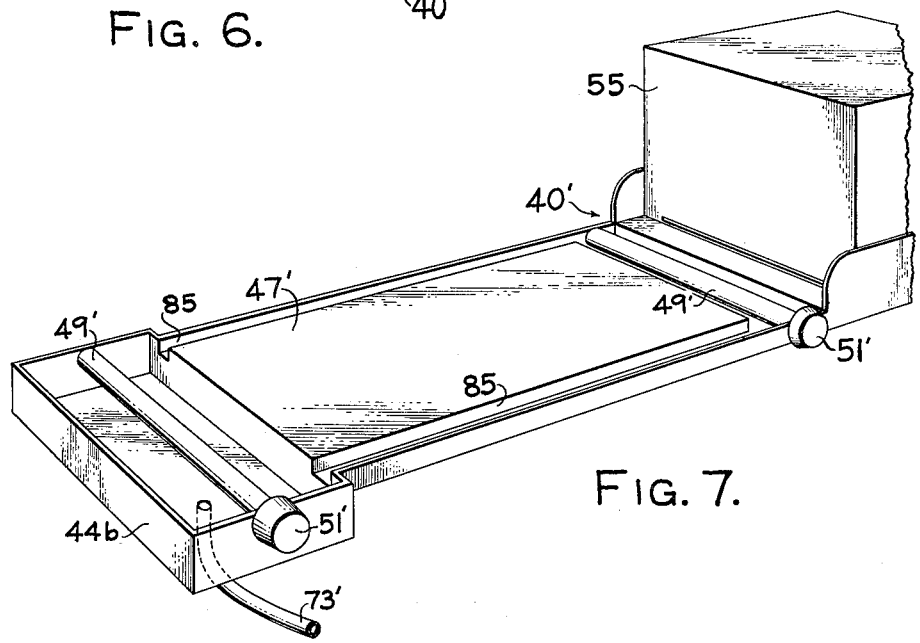

FIG. 6 and FIG. 7 are enlarged top perspective views of a modified embodiment of the exposure-developer unit of my invention.

Similar reference characters designate similar parts throughout the different views.

It is to be noted, in the examinat'on of the description and of the drawings, that those portions of my machine which are well known in the art and present no novelty, are described and shown generally and without full detail, since they represent photographic projection and focusing means commonly used in the art, and well understood, the novel features of my invent'on being, on the other hand, fully described and detailed.

Illustrative of the embodiment shown by FIGS. 1 and 2, my visible photo composing machine 10 comprises a housing 11, a projector unit 12 and an exposure-developer unit 13. The projector unit 12 is mounted on the housing 11 and supported thereon by means of a pair of standards 14, one of which is engaged with a control knob 15, by a worm gear arrangement (not shown), by means of which the projector unit 12 is raised and lowered with respect to the housing 11 for front focusing, as will hereinafter be described. The forward section of the projector unit 12 is flared and provided on each side with a vertical shaft 16 upon which is mounted a rotatable drum 17 provided with a knob 18 for rotation thereof, each of the drums 17 having means (not shown) to engage an edge of a roll film 19, to move the film 19 transverse the projector unit 12 in either direction, the drums 17 being adapted to coil the excess film 19 rotated in their respective directions. An opaque removable shield 20 encloses the forward section of the projector unit 12 in light-tight arrangement, and it is provided with viewing windows 21 composed of a light-filtering material, such as red or amber plastic, through which the film 19 may be seen.

Centrally within the projector unit 12 is provided a plate 22 pivotally mounted upon the base thereof by means of a pin 23 and secured to a solenoid 24 by an arm 25, for pivotal movement of the plate 22 as will hereinafter be explained. The plate 22 is provided with electrical sockets 26 and 27 in which are provided a yellow, indicator bulb or safe-light 28 and a light projection bulb 29. Between the plate 22 and the film 19 there are provided condensing lenses 30 to condense the light coming from the bulbs 28 and 29.

The shield 20 has a central opening 31 in which is fitted a light-resistant, hollow shaft 32 extending at right angles thereto and terminating above the exposure-developer unit 13. The shaft 32 is provided at its terminal end with a prism 33 through which light and images projected from the projector unit 12 through the shaft 32 are directed upon the exposure-developer unit 13. Behind the prism 33, within the shaft 32, is a lens 34, which is movable longitudinally within the shaft 32 by means of a control knob 35, for focusing the projected images upon the exposure-developer unit 13, the mechanical means for the movement of the lens 34 not being otherwise shown, since it may comprise any one of the numerous mechanical means well known in the art, such as rack and pinion, and the like. The roof of the projector unit 12 is provided with a removable cover 36 which acts as a vent for the escape of heat from within the unit 12, and for access to the interior thereof.

The terminal end of the shaft 32, and the prism 33 therein, are enclosed within the upper portion of a hollow vertical shaft 37 composed of a filter material, such as red or amber plastic, the lower edges of the shaft 37 adapted to rest upon the upper surface of the exposure-developer unit 13, as shown. The opening 38 in the shaft 37, which receives the terminal end of the shaft 32 is surrounded by a flexible opaque material 39, which is removably attached to the terminal end of the shaft 32 so as to permit vertical and horizontal movement of the shaft 32 within the opening 38 for the proper focusing of the projected images and for enlargement and reduction of size of the images, as will hereinafter be described.

Coming now to the exposure-developer unit 13, the unit 13 comprises a front chamber 40, a rear chamber 41 and a central chamber 42, the unit 13 being secured in movable relationship to the housing 11 by a mechanical arrangement (not shown) in engagement with a vertical shift control knob 43 in the housing 11, by which the exposure-developer unit 13 is movable towards and away from the housing 11, as required. The front chamber 40 comprises a body section 44, of opaque material, and a lid 45 of light-filtering material such as red or amber plastic, the lid 45 being removable from the body section 44, and removably secured thereto by means of clips 46. The body section 44 is provided with a paper transport bed 47 on which are secured a plurality of guides 48. On each side of the transport bed 47 there is provided a drive roller 49 rotatably secured to the body section 44 and extending through the front wall 50 thereof, terminating in a knob 51 adapted to advance the photographic paper 52 along the transport bed 47. The side walls of the body section 44 are slotted, as at 53 and 54, through which the photographic paper 52 enters and leaves the front chamber 40. Adjacent the front chamber 40 is provided a paper receptacle 55, in which a roll of light-sensitized, or photographic, paper 52 is contained, the paper 52 being in position so as to be drawn through a feed tube 52a to pass over the transport bed 47.

The lid 45 is provided with a pair of compression rollers 56 secured at either side thereof by means of spring engagements 57, the rollers 56 being adapted to co-act with the drive rollers 49 when the front chamber 40 is closed, to advance the paper 52 along the transport bed 47 by rotation of the knobs 51. Extending longitudinally through the lid 45 are a pair of parallel hollow arms 58, connected at one end to a vacuum sweeper 59, and at the other end extending through the side of the lid 45 and secured together by a cross arm 60, likewise hollow. Adjacent the vacuum sweeper 59 the arms 58 are attached to the sides of a filter shield 61, also composed of red or amber plastic material, which fits in normal position over an exposure opening 62 in the lid 45, directly beneath the opening of the vertical shaft 37, the shield 61 adapted to be slid away from the exposure opening 62 by the lateral movement of the arms 58 in one direction, and to cover the opening 62 on return movement. A rubber squeegee 63 is secured transverse the lid 44, adapted to press against the side of the transport bed 47, in locked position of the lid 45, to remove excess fluids from the paper 52 as it passes off the transport bed 47, as will hereinafter be explained. The lid 45 is further provided with openings 64 and 65 in the wall thereof facing into the center chamber 42.

Within the center chamber 42 there are provided a pair of containers 66 and 67 disposed with nozzles directed into the respective openings 64 and 65 leading into the front chamber 40. The container 66 is filled with a rapid developing solution under gas pressure, and the container 67 is filled with a rapid acid fixing hardening solution, likewise under gas pressure. An activating arm 68 is provided in engagement with a solenoid 68a connected to the nozzles of the respective containers 66 and 67, the activating arm 68 extending out of the chamber 42 in the direction of the cross-arm 58, the lateral movement of the activating arm 68 adapted to activate the solenoid 68a to depress the nozzles of the containers 66 and 67 under specific conditions so as to force the respective solutions through the openings 64 and 65 and over the photographic paper 52 as it lies on the transport bed 47.

A suction pump 70 is provided upon the rear chamber 41, to which a suction tube 71 is attached (attachment not shown), the tube 71 extending into branches 72 and 73, branch 72 being connected to the hollow arm 58 and branch 73 being connected to an opening in the floor of the body section 44 of the front chamber 40, as shown, so as to provide for suction and drainage of excess fluids from the front chamber 40 through the vacuum sweeper 59 and from the floor of the chamber 40 in a manner to be hereinafter described.

An electronic reset timer 74 is provided on the top of rear chamber 41. A Master switch 75 is provided at the side of rear chamber 41, connected to an electrical current source (not shown), and wired to the timer 74, the suction pump 70, to the solenoid 24 and lights 28 and 29, the solenoid 24 being controlled by a control switch 76, all in a manner well known in the art, the switches 75 and 76 having each an indicator light 77 and 78.

The master switch 75 is controlled by the pivotal movement of a control arm 79 extending therefrom and supporting a hand piece 80, and provided centrally with a slot 81 and a drive pin 82 adapted to engage the arm 68 activating the containers 66 and 67. The hollow arms 58 are joined by means of a cross bar 83 provided with a driving pin 84 adapted to engage the slot 81 when the lid 45 is secured to the body 44 of the front chamber 40, as shown in FIG. 1.

The photographic paper 52 may be either contact or enlarging paper, but I have found contact paper preferable for use with the machine.

In the operation of the machine the paper 52 is drawn from the receptacle 55 and placed across the transport bed 47 between the guides 48, and the lid 45 is locked to the body 44 with clips 46. The shaft 37 is fitted upon the lid 45 and the paper 52 advanced across the transport bed 47 by rotation of the roller 49 to the position desired. The film 19 is secured to the drums 17. The switches 75 and 76 are turned on, activating the safelight 28, and the film 19 moved by rotation of the proper drum 17 until the desired image on the film 19 is projected on to the paper 52. Control knobs 15 and 35 are then rotated until the image is properly focussed on the paper 52. Timer 74 is set for the time exposure required and control arm 79 is pulled out away from the machine. As the control arm 79 is pulled out the pump 70 is activated and the vacuum sweeper 59 starts sucking out the previously used chemicals, the shield 58 moves across the lid 45 exposing the opening 62 and the solenoid 24 is activated to swing the projector bulb 29 into position behind the condensing lenses 30 and energized to throw white exposure light through the film 19 onto the paper 52 through the opening 62 for the time designated by the electronic timer 74. As the control arm 79 is pushed back to its original position the arm 68 activates the solenoid 68a to depress the nozzles of the containers 66 and 67, spraying the developing and fixing chemicals on the exposed paper 52. At the same time the filter shield 61 returns across the opening 62, the safelight 28 is swung back to its original position, and the machine is ready for spacing, and rotation of the film 19 to the next image to be photographed. Because of its location the vacuum sweeper 59 removes only the exhausted developing chemical, the fixing chemical keeps adding, with each operation, on to the images developed as the paper 52 is transported across the transport bed 47. Excess chemicals overflow the bed 47 and drain out through the suction tube 73.

The exposure and developing cycles are shown diagrammatically by FIGS. 3 and 4. In the embodiment shown the total movement of the control arm 79 is a distance of two inches, electronically adjusted as follows: In the first 1¾ inches of movement of the control arm 79 away from the machine the vacuum sweeper 59 removes the exhausted developer of the previous operations; in the last ¼ inch of movement the timer 74 activates the solenoid 24 to swing the projector bulb 29 into position behind the condensing lenses 30 to expose the paper 52 through the exposure opening 62 (the filter shield 61 having been removed therefrom) the required exposure time as set by the timer 74, after which the safelight 28 is returned to its original position. On the return cycle the movement of the arm 68 activates the solenoid 68a to depress the nozzles of the chemical containers 66 and 67 to cover the paper 52 with the developer and fixer. On the last ¼ inch of return movement the solenoid 68a is deactivated, and the chemical sprays stop.

Control knobs 15 and 35 are rotated to adjust the size of the image on the paper 52, by enlargement or reduction, and to focus same. Where it is desired to enlarge or reduce the image size in one direction only a plano concave or plano convex lens can be placed before the condensing lenses 30. The ensuing image can, by rotation of the knobs 51, be spaced as desired, or overlapped.

Where it is desired to stagger the images with respect to one another, or "jump" them, the vertical shift control knob 43 is rotated to move the exposure-developer unit 13 towards or away from the housing 11, so that the ensuing image is below or above the line of the previously photographed images.

FIGS. 6 and 7 show a modified arrangement for the exposure-developer unit 13, in which the central chamber 42 of FIG. 1 is omitted. In this modification the body section 44' of the front chamber is provided in two sections, 44a and 44b, section 44b having the paper receptacle 55 secured thereto, transport bed 47', drive rollers 49' and advance knobs 51'. Suction tube 73' is connected to the floor of section 44b, and grooves 85 are provided in the transport bed 47'.

Upper section 44a is provided along its rear wall with three shelves 86 adapted each to receive one of the brush sections of a brush 87 attached to an arm 88 which in turn is connected to a solenoid (not shown), activated by the master switch 75. A small opening 89 is provided in the rear wall of the section 44a above each of the shelves 86. The chemical solutions of developer, acetic acid and fixer are contained in respective containers 90, 91 and 92 seated in a support 93 disposed on top of the exposure-developer 13. A small tubing 94 connects each of the containers 90, 91 and 92 to respective openings 89a, b and c so as to allow the respective chemicals to drip onto the respective shelves 86. In normal position the brush 87 is disposed with portions on the respective shelves 86, becoming saturated with the respective chemical solutions.

In the operation of the machine with the modifications shown by FIGS. 6 and 7, on the return 1¾" movement of the control arm 79 the arm 88 is activated by the solenoid (not shown) to move the brush 87 across the transport bed 47', over the paper 52, to develop, stop and fix the exposed portions of the paper 52 with which they come into contact, all excess chemicals draining off through the suction tube 73. As is apparent, as each image is exposed, and then transported across the transport bed 47' while the machine continues to be operated upon other images, it is first contacted by the developer chemical, thereafter by the acetic acid and finally by the fixing chemical, so that development takes place as is well known in the art.

While the movement of the control arm 79, and other features of these embodiments, are shown to be mechanical, electrical or electronic activation may as easily be substituted within the scope of the invention. The foregoing description and drawings merely show embodiments for the purpose of illustration only, and not of limitation, and various changes may be made in the construction, composition and arrangement of parts thereof, of substitution of equivalents, or in the steps of procedure, without limitation on, or departure from the spirit and scope of my invention, or sacrificing any of the advantages thereof inherent therein, all of which are herein claimed.

As is also apparent, the basis features of my invention lie in the provision of an exposure-developer unit with the filter means to enable the operator to have constant visibility of the film, the projected images and the photographic paper, before, during and after exposure, and before, during and after developing, at all times. As such, this unit and its co-acting parts can be produced as a separate unit, in various sizes and arrangements, to co-operate with any existing type of photo enlarger, photo projector or similar machine, to perform all of the present actions of these machines, together with such additional applications as are possible with the use of the foregoing.

Having described my invention, I claim:

1. A photo composer comprising a projection unit, an exposure-developer unit, a hollow enclosure between the projection unit and exposure-developer unit, at least one transparent wall of safe-light filtering material in the enclosure, a film having a plurality of symbols thereon within the projection unit, a light sensitive paper within the exposure-developer unit, a source of developing chemicals within the exposure-developer unit, means to selectively move the film through the projection unit, means to project the film symbols onto the light sensitive paper through the hollow enclosure, means to vary the size of and focus the projected symbols upon the sensitized paper, a safe-light shield slidably carried within the exposure-developer unit between the paper and the projecting means whereby the projected symbol may be directed upon the paper and viewed through said safe-light shield and through the transparent enclosure wall without exposing the paper, means to shift the light sensitive paper with respect to the projected symbol to position the said symbol at a desired place upon the paper, means to move the safe-light shield to expose the sensitized paper and means to direct the developing chemicals upon the exposed portion of the paper to produce a photographic print of the projected symbol.

2. A photo composer comprising a projection unit, an exposure-developer unit, a hollow enclosure between the projection unit and exposure-developer unit, at least one transparent wall of safe-light filtering material in the enclosure, a film having a plurality of symbols thereon within the projection unit, a light sensitive paper within the exposure-developer unit, a source of developing chemicals within the exposure-developer unit, means to selectively move the film through the projection unit, means to project the film symbols onto the light sensitive paper through the hollow enclosure, means to vary the size of and focus the projected symbols upon the sensitized paper, a safe-light shield slidably carried within the exposure-developer unit between the paper and the projecting means whereby the projected symbol may be directed upon the paper and viewed through said safe-light shield and through the transparent enclosure wall without exposing the paper, means to shift the light sensitive paper with respect to the projected symbol to position the said symbol at a desired place upon the paper, means to move the safe-light shield to expose the sensitized paper, means to direct the developing chemicals upon the exposed portion of the paper to produce a photographic print of the projected symbol and means to apply fresh developing chemicals to the exposed paper after successive printing operations.

3. A photo composer comprising a projection unit, an exposure-developer unit, a hollow enclosure between the projection unit and exposure-developer unit, at least one transparent wall of safe-light filtering material in the enclosure, a film having a plurality of symbols thereon within the projection unit, a light sensitive paper within the exposure-developer unit, a source of developing chemicals within the exposure-developer unit, means to selectively move the film through the projection unit, means to project the film symbols onto the light sensitive paper through the hollow enclosure, means to vary the size of and focus the projected symbols upon the sensitized paper, a safe-light shield slidably carried within the exposure-developer unit between the paper and the projecting means whereby the projected symbol may be directed upon the paper and viewed through said safe-light shield and through the transparent enclosure wall without exposing the paper, means to shift the light sensitive paper with respect to the projected symbol to position the said symbol at a desired place upon the paper, means to move the safe-light shield to expose the sensitized paper, means to direct the developing chemicals upon the exposed portion of the paper to produce a photographic print of the projected symbol, means to apply fresh developing chemicals to the exposed paper after successive printing operations and means to remove the exhausted developing chemicals from the paper.

4. A device according to claim 1 in which the source of developing chemicals comprises at least one container for the developing chemicals, a quantity of gas under pressure within the container and a nozzle for directing the chemicals expelled by the gas.

5. A device according to claim 1 in which the source of developing chemicals comprises at least one container, a tube from the container to the interior of the exposure-developer unit, and the means to direct the developing chemicals upon the paper consists of at least one brush slidably carried within the exposure-developer unit to carry the chemicals from the dispensing end of the tube to the paper.

6. A device according to claim 3 in which the chemical removing means comprises a suction tube communicating with the interior of the exposure-developer unit.

References Cited in the file of this patent

UNITED STATES PATENTS

| | | |
|---|---|---|
| 1,149,490 | Baggs | Aug. 10, 1915 |
| 1,166,504 | Webster | Jan. 4, 1916 |
| 1,396,770 | Mees | Nov. 15, 1921 |
| 1,805,333 | Hunter | May 12, 1931 |
| 2,010,561 | Ogden | Aug. 6, 1935 |
| 2,184,223 | Horman | Dec. 19, 1939 |
| 2,473,174 | Pifer | June 14, 1949 |
| 2,537,069 | Lohr | Jan. 9, 1951 |
| 2,760,418 | Hawn | Aug. 28, 1956 |
| 2,762,277 | McChesney | Sept. 11, 1956 |